United States Patent
Lee (10) Patent No.: US 12,315,114 B2
(45) Date of Patent: May 27, 2025

(54) IMAGE PROCESSING METHOD OF PROCESSING IMAGES FROM A PLURALITY OF CAMERAS IN SHIP CLEANING ROBOT INTO SINGLE IMAGE, COMPUTER READABLE RECORDING MEDIUM, COMPUTER PROGRAM, AND ROBOT CONTROL METHOD USING THE SAME

(71) Applicant: TAS GLOBAL CO., LTD., Gangseo-gu Busan (KR)

(72) Inventor: Dong Wook Lee, Gangseo-gu Busan (KR)

(73) Assignee: TAS GLOBAL CO., LTD., Busan (KR)

( * ) Notice: Subject to any disclaimer, the term of this patent is extended or adjusted under 35 U.S.C. 154(b) by 0 days.

(21) Appl. No.: 17/790,796

(22) PCT Filed: Mar. 22, 2022

(86) PCT No.: PCT/KR2022/003963
§ 371 (c)(1),
(2) Date: Jul. 5, 2022

(87) PCT Pub. No.: WO2022/203340
PCT Pub. Date: Sep. 29, 2022

(65) Prior Publication Data
US 2024/0169485 A1    May 23, 2024

(30) Foreign Application Priority Data
Mar. 22, 2021  (KR) .......... 10-2021-0036557
Mar. 21, 2022  (KR) .......... 10-2022-0034833

(51) Int. Cl.
*G06T 5/50*    (2006.01)
*A47L 11/40*   (2006.01)
*G06V 10/60*   (2022.01)

(52) U.S. Cl.
CPC ............ *G06T 5/50* (2013.01); *A47L 11/4052* (2013.01); *G06V 10/60* (2022.01); *G06T 2207/20221* (2013.01)

(58) Field of Classification Search
CPC ............ G06T 5/50; G06T 2207/20221; A47L 11/4052; G06V 10/60
See application file for complete search history.

(56) References Cited

U.S. PATENT DOCUMENTS 4,697,536 A * 10/1987 Hirata ............... B63B 59/10
                                          114/333
6,483,644 B1 * 11/2002 Gottfried ........... H04N 13/31
                                          382/285

(Continued)

FOREIGN PATENT DOCUMENTS

CN     103895835 A  *  7/2014
KR     10-1444387 B      9/2014

(Continued)

OTHER PUBLICATIONS

Guo, J. Y., Chin, C. S., Clare, A. S., & Ma, M. (Apr. 2016). Interactive vision-based intelligent system for active macfouling and microfouling detection on hull. In Oceans 2016—Shanghai (pp. 1-8). IEEE.*

(Continued)

*Primary Examiner* — Sarah Lhymn
(74) *Attorney, Agent, or Firm* — PnK IP LLC (57) ABSTRACT

Disclosed is an image processing method of processing a plurality of images into a single image, including: obtaining at least a left image, a center image, and a right image from a plurality of cameras arranged in a row; generating a left (Continued)

top-view image, a center top-view image, and a right top-view image based on the left image, the center image, and the right image, respectively; generating one wide top-view image by merging the left top-view image, the center top-view image, and the right top-view image; and generating and outputting the wide top-view image as a final wide image. Thus, the images from the plurality of cameras are merged into a single image, thereby reducing fatigue of a robot operator.

9 Claims, 5 Drawing Sheets

(56) References Cited

U.S. PATENT DOCUMENTS

| | | | | |
|---|---|---|---|---|
| 6,975,334 | B1* | 12/2005 | Barrus | G06T 15/50 |
| | | | | 382/173 |
| 11,274,929 | B1* | 3/2022 | Afrouzi | G06T 7/30 |
| 2005/0219240 | A1* | 10/2005 | Vesely | H04N 13/366 |
| | | | | 348/E13.045 |
| 2005/0264858 | A1* | 12/2005 | Vesely | H04N 13/279 |
| | | | | 359/13 |
| 2006/0221071 | A1* | 10/2006 | Vesely | G06T 15/20 |
| | | | | 345/419 |
| 2008/0174659 | A1* | 7/2008 | McDowall | H04N 5/265 |
| | | | | 348/E15.001 |
| 2010/0141737 | A1* | 6/2010 | Li | H04N 23/698 |
| | | | | 348/E7.001 |
| 2010/0208032 | A1* | 8/2010 | Kweon | H04N 23/698 |
| | | | | 348/148 |
| 2012/0006352 | A1* | 1/2012 | Holappa | B08B 1/30 |
| | | | | 134/6 |
| 2012/0038549 | A1* | 2/2012 | Mandella | G06F 3/011 |
| | | | | 345/156 |
| 2013/0113892 | A1* | 5/2013 | Nakamaru | H04N 13/117 |
| | | | | 348/47 |
| 2015/0170417 | A1* | 6/2015 | Palm | A63F 13/5375 |
| | | | | 345/633 |
| 2016/0098095 | A1* | 4/2016 | Gonzalez-Banos | A63F 13/92 |
| | | | | 345/156 |
| 2017/0049311 | A1* | 2/2017 | Borovinskih | A61C 7/002 |
| 2017/0228605 | A1* | 8/2017 | Konishi | B60R 1/00 |
| 2019/0325198 | A1* | 10/2019 | Friedland | G08B 13/196 |
| 2021/0089040 | A1* | 3/2021 | Ebrahimi Afrouzi | |
| | | | | A47L 9/2873 |
| 2021/0371062 | A1* | 12/2021 | Dyhrberg | G06T 1/0007 |
| 2022/0066456 | A1* | 3/2022 | Ebrahimi Afrouzi | |
| | | | | G06F 3/04883 |
| 2024/0116607 | A1* | 4/2024 | Lee | B63B 59/10 |

FOREIGN PATENT DOCUMENTS

| | | | |
|---|---|---|---|
| KR | 10-2017-0057684 | | 5/2017 |
| KR | 10-2018-0006733 A | | 5/2018 |
| KR | 10-2188721 B | | 12/2020 |
| WO | WO-2014043411 A1 * | 3/2014 | B62D 55/24 |

OTHER PUBLICATIONS

Jiang, P., Wei, O., Chen, Y., Yang, O., Fan, J., Shou, Z., & Huang, Z. (Feb. 2018). Real-time panoramic system for underwater cleaning robot. In 2018 IEEE 9th International Conference on Mechanical and Intelligent Manufacturing Technologies (ICMIMT) (pp. 155-159). IEEE.*

Office Action received in corresponding Application No. 10-2022-0034833, 4 pages.

* cited by examiner

IMAGE PROCESSING METHOD OF PROCESSING IMAGES FROM A PLURALITY OF CAMERAS IN SHIP CLEANING ROBOT INTO SINGLE IMAGE, COMPUTER READABLE RECORDING MEDIUM, COMPUTER PROGRAM, AND ROBOT CONTROL METHOD USING THE SAME

RELATED APPLICATIONS

The present application is the national stage entry of International Patent Application No. PCT/KR2022/003963 having a filing date of Mar. 22, 2022, which claims priority to Korean Patent Application No. 10-2021-0036557 having a filing date of Mar. 22, 2021, and Korean Patent Application No. 10-2022-0034833 having a filing date of Mar. 21, 2022, which are incorporated herein by reference.

TECHNICAL FIELD

The disclosure relates to a method of processing images from a ship cleaning robot, and more particularly to an image processing method of processing images from a plurality of cameras in a ship cleaning robot into a single image.

BACKGROUND ART

From a moment when even a newly built ship touches seawater, various marine organisms begin to be attached to a bottom surface of a hull (hereinafter, referred to as a hull surface). Various marine organisms such as slime, seaweed, barnacles, mussels, etc. are attached to the hull surface, and the ship is decreased in speed and increased in expenditure on fuel by 10 to 30% according to the amount of attached marine organisms. Therefore, it is essential to clean the hull surface.

To prevent the marine organisms from being attached to the hull surface, the hull surface is coated with antifouling paint, but the antifouling paint merely delays time until the marine organisms are attached. For example, after about a year, barnacles, mussels, and the like organisms (hereinafter, referred to as barnacles), which significantly increase water resistance, are attached to the hull surface while forming colonies. In order to remove such marine organisms, the hull surface needs to be cleaned by a diver or a ship cleaning robot (hereinafter, referred to as a robot).

When the sunlight or lighting illuminates the inside of the seawater, the light is scattered by fine dust, plankton, etc. in the seawater, thereby shortening an identification distance of naked eyes or a camera. In port where ships are cleaned, most of seawater has an identification distance of 20 to 50 cm. Therefore, when the hull surface is cleaned using the robot, the identification distance of about 20 to 50 cm needs to be taken into account. For example, when one camera using a wide-angle or fisheye lens is installed in the front center of the robot, the identification distance is generally about 40 to 100 cm from the left to the right of the camera. For instance, when the robot has a width of 100 cm and the identification distance is 50 cm, one camera is enough to identify everything from the left to the right of the robot. However, when the identification distance is 20 cm, identification is possible within only a range of 40 cm from the left to the right of the camera, and therefore nothing is identified at the left or right sides of the robot except a central range.

When cleaning is applied to the hull surface, a boundary line between an uncleaned portion and a cleaned portion (hereinafter, referred to as a cleaning boundary line) becomes clear. The robot moves with a cleaning brush, the left or right end of which is positioned at the cleaning boundary line. However, when the identification distance is 20 cm, the cleaning boundary line needs to be close to the camera installed at the center of the robot, thereby causing a problem that cleaning time takes more than twice as compared to that of when the cleaning boundary line is close to the left or right end of the cleaning brush. To solve this problem, several cameras may be placed at intervals of 20 to 40 cm, but a robot operator may be increased in mental fatigue because s/he has to alternately control several cameras.

Accordingly, there is a need for merging images from several cameras into a single image in order to reduce the fatigue of the robot operator who controls the cameras for a long time.

DOCUMENTS OF RELATED ART

Patent Documents (Patent document 1) KR 10-1444387 B1
(Patent document 2) KR 10-2188721 B1

DISCLOSURE

Technical Problem

Accordingly, an aspect of the disclosure is to provide an image processing method of merging images from a plurality of cameras into a single image to reduce fatigue of a robot operator.

Another aspect of the disclosure is to provide an image processing method of brightening a dark part of an image to reduce fatigue of a robot operator.

The problems to be solved by the disclosure are not limited to those mentioned above, and other unmentioned problems will become apparent to a person skilled in the art by the following descriptions.

Technical Solution

A First Aspect of the Disclosure May be Achieved by
an image processing method of processing a plurality of images into a single image, including steps of: obtaining at least a left image, a center image, and a right image from a plurality of cameras arranged in a row; generating a left top-view image, a center top-view image, and a right top-view image based on the left image, the center image, and the right image, respectively; generating one wide top-view image by merging the left top-view image, the center top-view image, and the right top-view image; and generating and outputting the wide top-view image as a final wide image.

In this case, the left image, the center image, the right image, and the final wide image may be perspective-view images each having one vanishing point, and the left top-view image, the center top-view image, the right top-view image, and the wide top-view image may be top-view images having no vanishing points and showing bottoms as if viewed from above.

Further, the step of generating the left top-view image, the center top-view image, and the right top-view image based on the left image, the center image, and the right image, respectively, and the step of generating and outputting the wide top-view image as the final wide image use perspective transformation, and when a transformation matrix is used for the perspective transformation, the transformation matrix in the step of generating the left top-view image, the center top-view image, and the right top-view image based on the left image, the center image, and the right image, respectively is an inverse matrix of the transformation matrix used in the step of generating and outputting the wide top-view image as the final wide image.

In addition, the step of generating one wide top-view image by merging the left top-view image, the center top-view image, and the right top-view image may include a step of making a boundary area semi-transparent in an area where at least two images among the left top-view image, the center top-view image and the right top-view image are overlapped, and removing the other area, in the left top-view image, the center top-view image and the right top-view image.

In addition, the step of obtaining at least the left image, the center image, and the right image from the plurality of cameras arranged in a row includes the steps of: with regard to each of the left image, the center image, and the right image, obtaining brightness information, saturation information, and hue information; obtaining inverted brightness information by inverting the obtained brightness information; obtaining first correction information for correcting the brightness information based on the inverted brightness information; generating transformed brightness information by applying the first correction information to the brightness information; and generating an image corrected with the transformed brightness information, the saturation information, and the hue information.

Further, the image processing method may further include the steps of: obtaining second correction information for correcting the saturation information based on the inverted brightness information; and generating transformed saturation information by applying the second correction information to the saturation information, wherein the saturation information used in the step of generating the image corrected with the transformed brightness information, the saturation information, and the hue information may be replaced with the transformed saturation information.

In addition, the step of obtaining the first correction information for correcting the brightness information based on the inverted brightness information or the step of obtaining the second correction information for correcting the saturation information includes, with respect to each pixel of the final wide image, obtaining the first correction information for the brightness information, which is not zero, or the second correction information for the saturation information, which is not zero, when the inverted brightness information is greater than or equal to a threshold value.

In this case, the first correction information and the second correction information may be different.

A second aspect of the disclosure may be achieved by
a computer readable recording medium recorded with a program to perform the foregoing method.

In addition, a third aspect of the disclosure may be achieved by
a computer program stored in a medium to perform the method, based on combination with hardware.

In addition, a fourth aspect of the disclosure may be achieved by
a robot control method including the steps of: establishing a control model for adjusting a moving speed of a robot and a rotation speed of a cleaning brush by learning any single image obtained or generated based on the image processing method; and adjusting the moving speed of the robot and the rotation speed of the cleaning brush based on the final wide image generated by processing the images obtained from the plurality of cameras provided in the robot by the image processing method, through the established control method.

In this case, the step of adjusting the moving speed of the robot and the rotation speed of the cleaning brush includes a step of informing an operator of the robot that the moving speed of the robot and the rotation speed of the cleaning brush are being adjusted, wherein such informing includes using at least one of a text, a picture, vibration, sound, and lighting.

Advantageous Effects

As described above, an image processing method of processing a plurality of images into a single image according to the disclosure has an advantage of reducing fatigue of a robot operator by merging images from a plurality of cameras into a single image.

Further, an image processing method of processing a plurality of images into a single image according to the disclosure has an advantage of reducing fatigue of a robot operator by brightening a dark part of an image.

Further, a robot control method using the foregoing image processing method according to the disclosure has an advantage of cleaning a ship more cleanly while reducing the fatigue of the robot operator.

DESCRIPTION OF DRAWINGS

Below, exemplary embodiments of the disclosure will be described in detail with reference to the accompanying drawings. However, the disclosure is not limited or restricted to the exemplary embodiments. Throughout the accompanying drawings, like numerals refer to like elements.

BEST MODE

Although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the disclosure. The terminology used herein is for the purpose of describing particular embodiments only, and is not intended to limit the disclosure. Singular forms are intended to include plural forms as well, unless the context clearly indicates otherwise.

As the terminology used in the disclosure, general terms indicating the functions of the disclosure and currently used as widely as possible are selected. However, these terms may be varied depending on intension of those skilled in the art, the precedents, the advent of new technology, etc. In particular, an applicant may voluntarily choose terms, and in this case the meaning of these terms will be explained in detail in the corresponding description of the disclosure. Therefore, the terminology used in the disclosure should be defined based on not mere naming but its meaning and description made throughout the disclosure.

Figure 1:
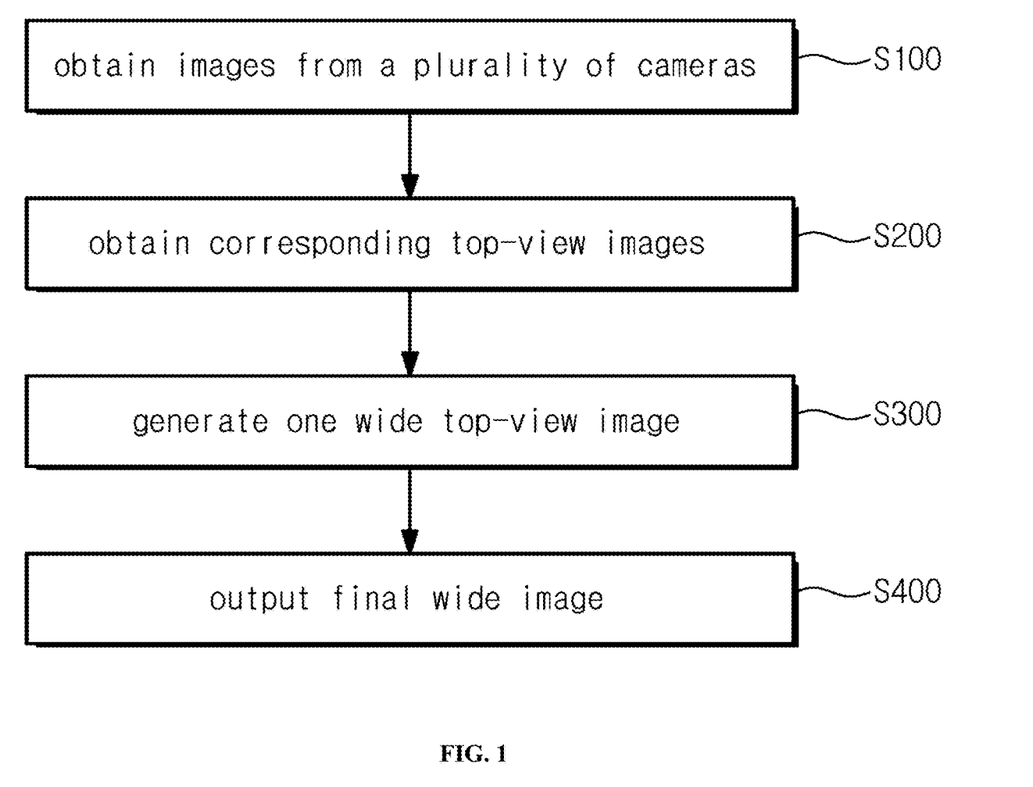
FIG. 1 is a flowchart of an image processing method according to the disclosure.

Throughout the disclosure, when a certain part includes a certain element, the term "include" is intended to not exclude another element but include one or more additional elements unless otherwise specified FIG. 1 is a flowchart of an image processing method according to the disclosure. Referring to FIG. 1, the image processing method according to the disclosure includes the steps of essentially obtaining images from a plurality of cameras (S100), obtaining top-view images corresponding to the obtained images (S200), generating one wide top-view image by merging the obtained top-view images (S300), and finally outputting a final wide image (S400).

Figure 2:
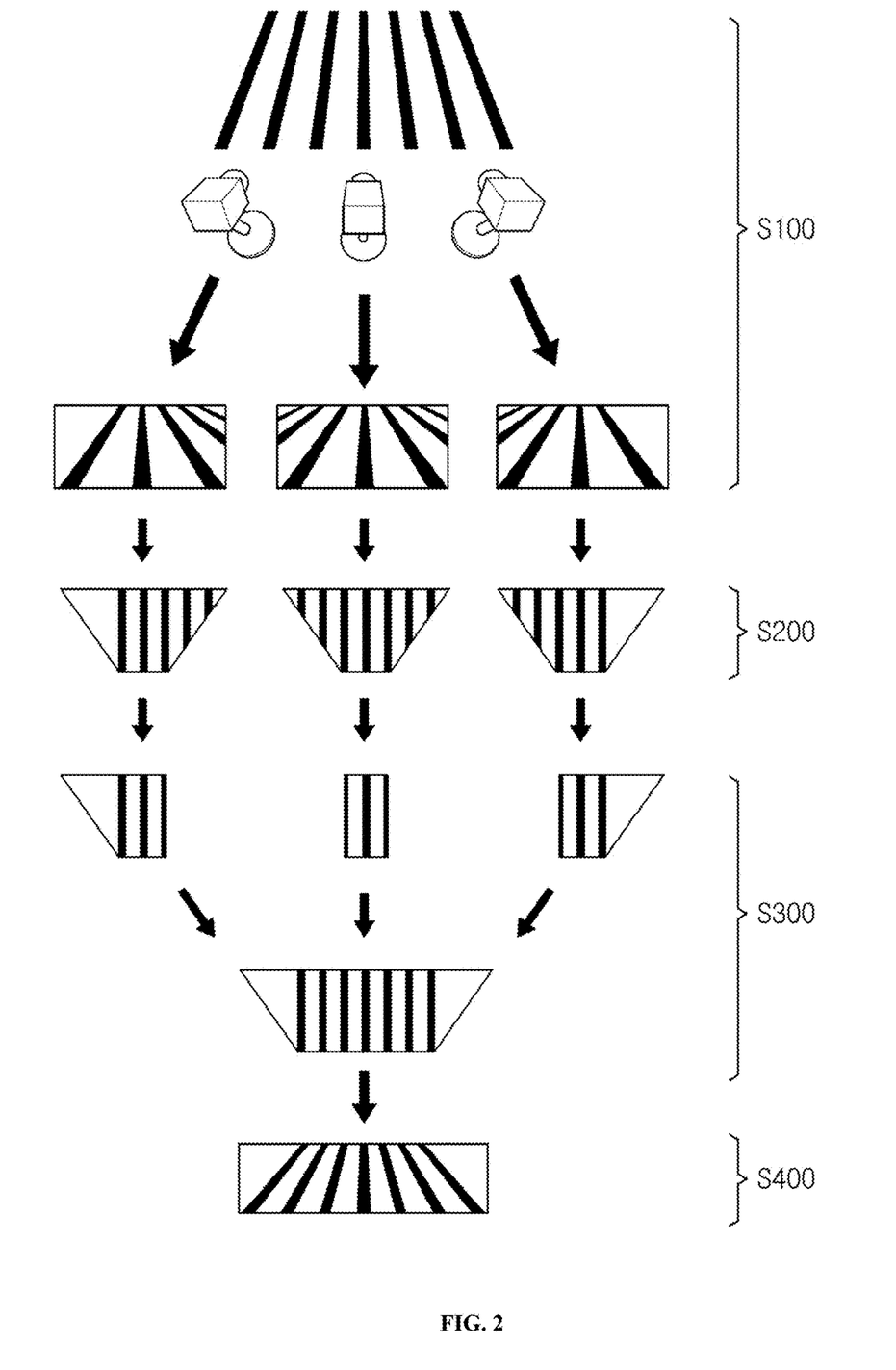
FIG. 2 illustrates an embodiment of an image processing method according to the disclosure.

In this regard, detailed descriptions will be made with reference to FIG. 2 showing FIG. 2 illustrating an embodiment of an image processing method according to the disclosure.

Referring to FIG. 2, the step S100 of obtaining the images from the plurality of cameras according to the disclosure includes a step of obtaining images respectively captured by a plurality of cameras arranged in a row (hereinafter, referred to as camera images).

In this case, the camera image refers to a perspective-view image with one vanishing point, and the images respectively captured by the cameras may be called a left image, a center image, and a right image according to their arranged positions. These images are named based on three cameras used in this embodiment. For example, in the case of using five cameras, these images may be referred to as a first left image, a second left image, a center image, a first right image, and a second right image, but not limited thereto.

Further, the step S200 of obtaining the corresponding top-view images according to the disclosure includes a step of generating a left top-view image, a center top-view image, and a right top-view image based on the left image, the center image, and the right image, respectively.

In this case the left top-view image, the center top-view image, and the right top-view image refer to the top-view images having no vanishing points and showing the bottom as if viewed from above. To generate the top-view image from the perspective-view image, perspective transformation is used. The principle of perspective is that a distant thing looks small and a near thing looks big. A method of transforming an image based on the principle of perspective is a perspective transformation. In general, the perspective transformation uses only four points in an image to find a transformation matrix and transform the image. By the perspective transformation, a planar image is obtained as if it is scanned. The perspective transformation is a universal technology that is being utilized in processing a lane-view image to detect a driving line for an autonomous vehicle, and also utilized for various other purposes, and thus detailed descriptions thereof will be omitted.

Next, in the step S300 of generating one wide top-view image, the left top-view image, the center top-view image, and the right top-view image are merged into one wide top-view image. For example, the images are merged after removing all overlapped areas except a boundary area among areas by which at least two images such as the left top-view image and the center top-view image, and the center top-view image and the right top-view image are overlapped In this case, the images may be merged by for example making the boundary area semi-transparent in an area where at least two images are overlapped: and removing the other area from the images, or by making the boundary area in the area where at least two images are overlapped: be left only in one image but removed together in the other images when the other area is removed from the images. Here, the process of making the boundary area semi-transparent includes a process of halving numerical values which represent image information, for example, hue information, saturation information, brightness information, etc. of the original images such as the left top-view image, the center top-view image, and the right top-view image, so that the overlapped boundary areas can be simply added thereafter. Alternatively, the images may be merged by applying different weights to the images including the overlapped boundary area or by setting different parts to be left or removed in the overlapped boundary areas according to the images. In FIG. 2, a portion corresponding to the boundary area in the area where at least two images are overlapped, is shown as semi-transparent.

Last, the step S400 of finally outputting a final wide image includes a step of generating a final wide image based on one wide top-view image merged and generated by the foregoing perspective transformation.

In this case, when a transformation matrix A is used for the perspective transformation in the step S200 of obtaining the corresponding top-view image from the perspective-view image, an inverse matrix of the transformation matrix A may be used in the step S400 of obtaining the corresponding final wide image from the wide top-view image.

Thus, when the technology for merging the plurality of camera images having different vanishing points into one image based on the image processing method according to the disclosure is applied to, for example, the ship cleaning robot, it is possible to significantly reduce fatigue of a robot operator.

Meanwhile, the ship cleaning robot is manually or autonomously driven. In particular, when the ship cleaning robot is manually driven, a human on the ground or water operates the robot while monitoring images from the camera of the robot through a monitor.

In a case where a ship having a bottom on which the robot will travel is so large that sunlight cannot reach even in daylight, the robot travels using a lamp installed therein. However, even the light from the lamp cannot reach far because it is scattered by fine objects such as dust, plankton, etc. in the seawater, or absorbed in the seawater. Although a camera image is captured by an ultra-low level light camera capable of detecting even weak light unlike a general camera, the camera image is displayed darkly on the monitor when a small amount of light emitted from the lamp installed in the robot returns to the camera as reflected from the hull surface. Further, the camera image rapidly becomes dark as a distance from the robot increases.

Figure 3:
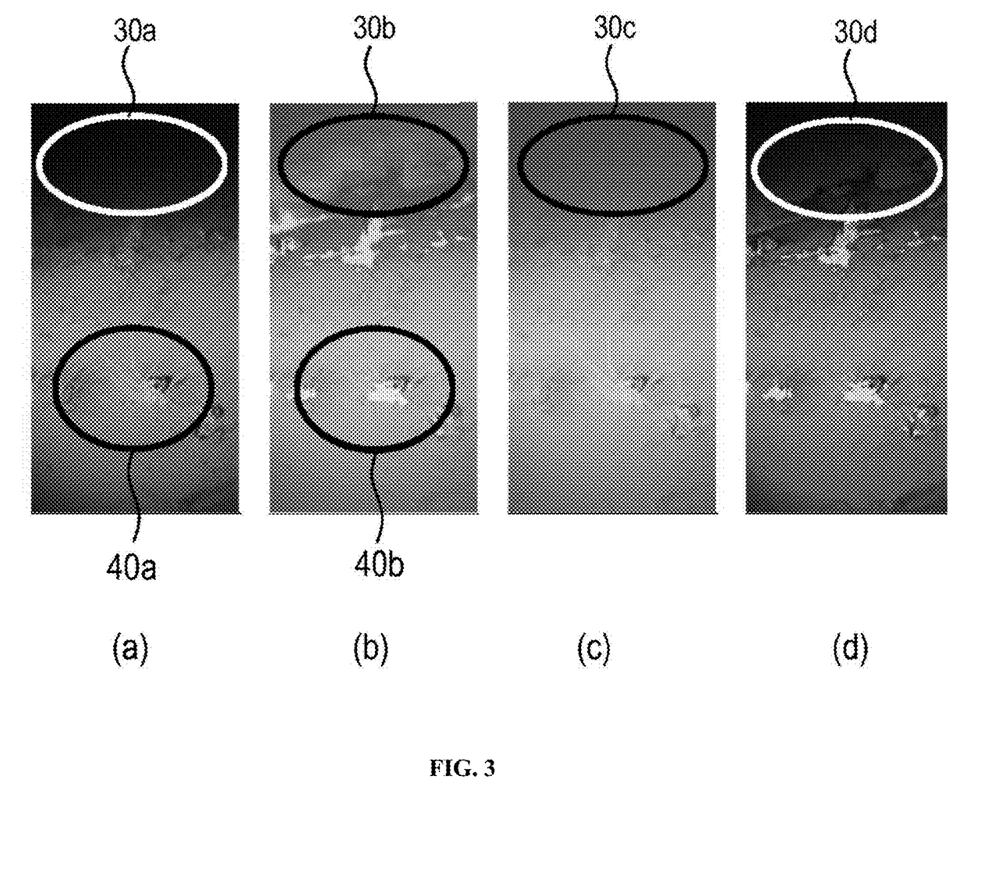
FIG. 3 shows examples of a conventional image processing method.

To identify even a dark area, the saturation of the camera image may be increased. However, simple increase in saturation may excessively darken a color and cause a thin pattern to disappear, thereby making it more difficult to identify the object. Such a conventional technology has problems which will be described with reference to FIG. 3 showing examples of a conventional image processing method. In FIG. 3, (a) shows an original image captured by the camera of the ship cleaning robot that is, for example, actually cleaning the hull surface, which includes a dark area 30a and a fine area 40a including a thin pattern. In FIG. 3, (b) shows an image obtained by increasing both numerical values of the brightness information and the saturation information in the original image, (c) shows an image obtained by increasing only the numerical value of the brightness information in the original image, and (d) shows an image obtained by increasing only the numerical value of the saturation information in the original image. When the brightness is increased to brighten the dark area like (c) of FIG. 3, the image generally blurs. When the saturation is increased to sharpen a blurred part like (d) of FIG. 3, shape distortion occurs, thereby causing a thin pattern to disappear. Therefore, when both the brightness and the saturation are increased to sharpen the blurred part while brightening the dark area, the dark area 30*b* is brightened but other areas are also more brightened than necessary like (b) of FIG. 3, thereby causing distortion and resulting in a problem that the thin pattern in the fine area 40*b* disappears.

Usually, a robot operator has to focus on the screen of the monitor for a long time, thereby having high metal or physical fatigue. Further, a moving distance of the robot per second is longer than the identification distance, a robot operator has to determine the states of obstacles or biofoulings on the hull surface and operate the robot while spending most of time in viewing the dark part of the camera image, thereby having high fatigue.

Accordingly, there is a need for technology that makes it easy to identify even a dark part of a camera image in order to reduce the fatigue of a robot operator who operates the robot for a long time. In this case, the technology that makes it easy to identify even the dark part may be used alone independently of or in conjunction with the foregoing technology of merging the images into the single image.

Figure 4:
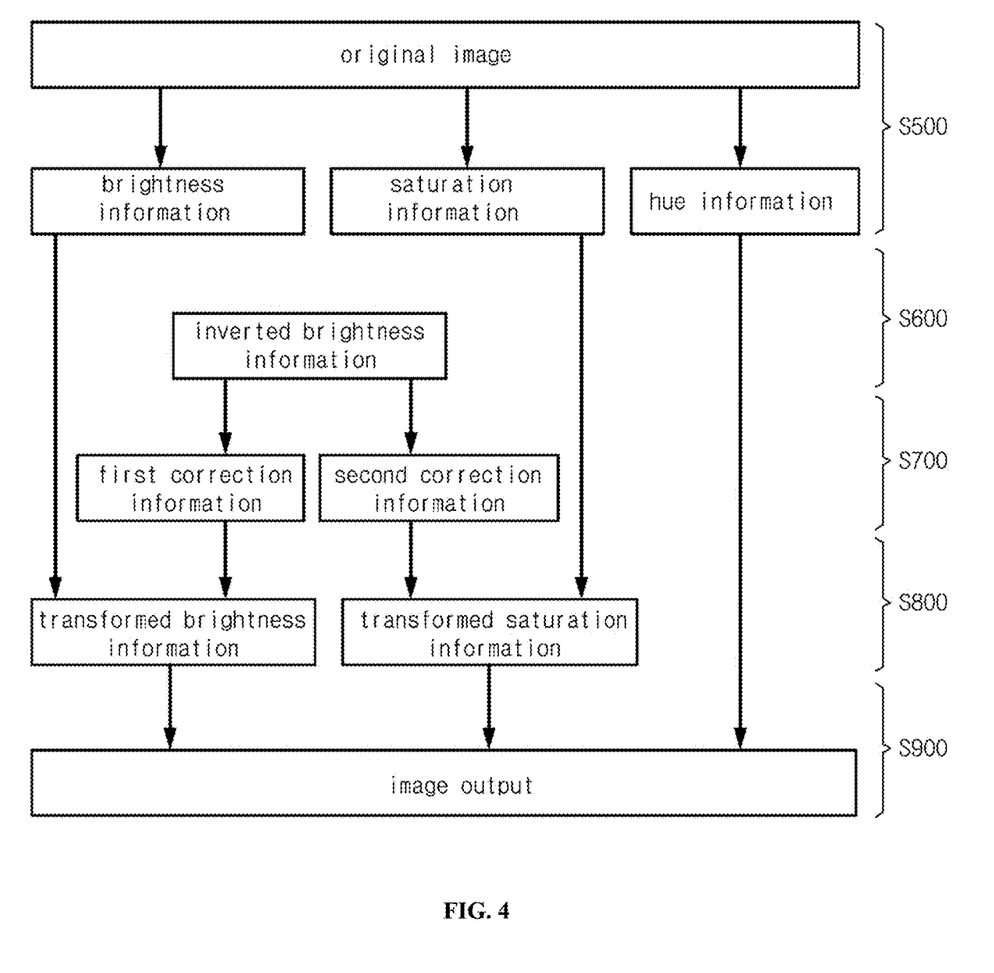
FIG. 4 shows information generated by an image processing method according to the disclosure.
Figure 5:
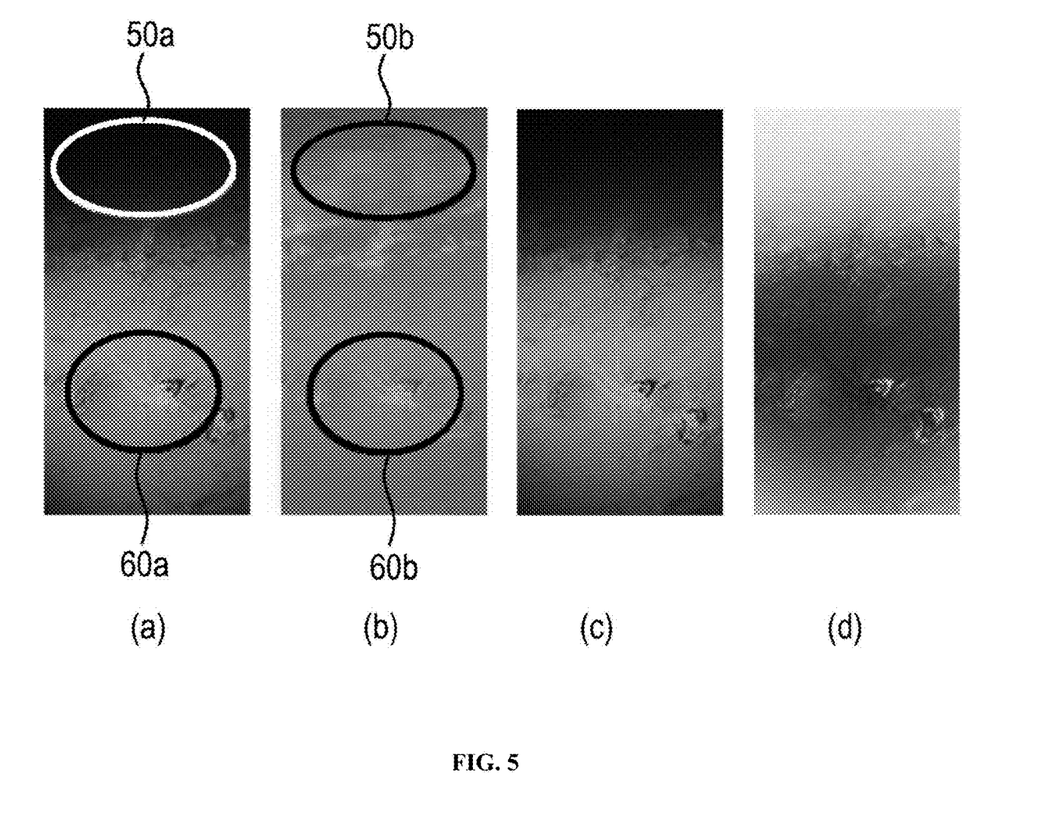
FIG. 5 shows examples of images processed by an image processing method according to the disclosure.

FIG. 4 shows information generated by an image processing method according to the disclosure, and FIG. 5 shows examples of images processed by an image processing method according to the disclosure.

Referring to FIG. 4, an image processing method according to the disclosure includes the steps of obtaining brightness information, saturation information, and hue information based on an original image (S500); obtaining inverted brightness information by inverting the obtained brightness information (S600); obtaining first correction information for correcting the brightness information based on the inverted brightness information (S700); generating transformed brightness information by applying the first correction information to the brightness information (S800); and generating an image corrected with the transformed brightness information, the saturation information and the hue information (S900).

Here, in the step S500 of obtaining the brightness information, the saturation information, and the hue information based on the original image, the original image may be each of the left image, the center image, and the right image captured by the plurality of cameras arranged in a row, or may be an image, for example, a final wide image obtained or generated in each step when used in conjunction with the technology of merging the images into the single image. The original image may be represented with red, green and blue (RGB) values, hue-saturation-brightness (HSB) values, or hue-lightness-saturation (HLS) values of pixels. When the original image is represented with the RGB values, the RGB values may be converted into and stored as the HLS values respectively showing the hue information, the lightness information, and the saturation information.

In the step S600 of obtaining the inverted brightness information by inverting the obtained brightness information according to the disclosure, the brightness information is usually represented with 256 levels from 0 corresponding to the darkest pixel to 255 corresponding to the brightest pixel with respect to individual pixels, and thus, for example, the inverted brightness information inverted from the brightness information having a value of 12 has a value of 255−12=243. This may be understood from that the brightness information shown in (c) of FIG. 5 is obtained from the original image shown in (a) of FIG. 5 and the inverted brightness information is shown in (d) of FIG. 5.

Next, the step S700 of obtaining first correction information for correcting the brightness information based on the inverted brightness information includes a step of obtaining the first correction information for correcting the brightness information, which is not zero, only when the inverted brightness information is greater than or equal to a threshold value. In other words, when the inverted brightness information is greater than or equal to the threshold value, the first correction information for correcting the brightness information may be greater than that of when the inverted brightness information is lower than or equal to the threshold value. For example, when the inverted brightness information is lower than or equal to the threshold value, the first correction information for the brightness information may be 0. The brightness adjustment to an appropriate level may be useful when it is not necessary to brighten even an area 60*a*, which satisfies a predetermined criterion, other than a dark area 50*a* in (a) of FIG. 5. Here, the threshold value may be experimentally defined as necessary.

Then, the step S800 of generating the transformed brightness information by applying the first correction information to the brightness information, and the step S900 of generating an image corrected with the transformed brightness information, the saturation information and the hue information are carried out.

Here, the image processing method according to the disclosure may further include the steps of obtaining second correction information for correcting the saturation information based on the inverted brightness information to appropriately adjust the saturation decreased or increased due to adjustment in brightness; and generating transformed saturation information by applying the second correction information to the saturation information. In this case, the saturation information used in the step of generating the image corrected with the transformed brightness information, the saturation information and the hue information may be replaced with the transformed saturation information. Like the step S700 of obtaining the first correction information for correcting the brightness information, a step of obtaining the second correction information for correcting the saturation information, which is not zero, may be included only when the inverted brightness information is greater than or equal to a threshold value. In other words, when the inverted brightness information is greater than or equal to the threshold value, the second correction information for correcting the saturation information may be greater than that of when the inverted brightness information is lower than or equal to the threshold value. For example, when the inverted brightness information is lower than or equal to the threshold value, the second correction information for the saturation information may be 0. This may be useful when it is not necessary to sharpen even a fine area 60*b*, which satisfies a predetermined criterion, in (b) of FIG. 5. Here, the threshold value may be experimentally defined as necessary. Of course, the threshold value used as a criterion for defining the first correction information and the threshold value used as a criterion for defining the second correction information may be set differently, and the first correction information and the second correction information may also be defined differently.

Accordingly, when the technology for processing only a dark area to become more noticeable while minimizing the distortion of color and shape in the original image based on the image processing method according to the disclosure is applied to, for example, the ship cleaning robot, an output image as shown in (b) of FIG. 5 is obtained, thereby resulting in significantly reducing the fatigue of the robot operator.

Meanwhile, a ship includes a bilge keel, an anode, a bow thruster, a sea chest, and the like area with or to which the ship cleaning robot may collide or cannot move while the hull surface is cleaned. A robot operator can know the position of the robot through a robot position tracking system, and thus carefully controls the robot before reaching the corresponding areas.

Besides slimes and seaweed, organisms with shells such as barnacles, mussels, etc. are attached to and live on the surface of the ship. Small-scale inhabitation of organisms with shells does not cause a significant problem, but large-scale inhabitation of organisms with shells may collide with the robot to stop or may allow the robot to ride up on the shells that are not removed, thereby causing the robot to break away from the hull surface. The slimes or seaweed may be cleaned by the robot moving at the maximum speed. On the other hand, in order to the attached organisms with the shells, the robot needs to perform cleaning at a low speed or increase a rotation speed of the cleaning brush. Accordingly, a robot operator has to appropriately control the moving speed of the robot or the rotation speed of the cleaning brush according to situations, but it may be very hard for the robot operator to control the robot whole focusing on the robot for a long time.

In order to reduce the fatigue of the robot operator who controls the robot for a long time, there is a need for an artificial intelligence technology that automatically controls the moving speed of the robot or the rotation speed of the cleaning brush by analyzing the images from the cameras installed in the robot.

The artificial intelligence refers to a program that is produced through deep learning, machine learning or the like learning and runs in a personal computer (PC), and may be included in a robot operating program or installed in a separately provided PC. Here, the robot operating program collectively refers to essential programs needed for a robot operator to generally control the robot, for example, command the robot to operate, display the images from the cameras installed in the robot on the monitor, display data about a sensor or the like installed in the robot on the monitor, etc. In particular, the robot operating program associated with the ship cleaning robot that can perform the image processing method according to the disclosure involves the moving speed of the robot and the rotation speed of the cleaning brush which are defined according to situations. When the robot operating program is executed, the moving speed of the robot and the rotation speed of the cleaning brush are adjusted according to the following control models.

In order to reduce the fatigue of the robot operator who controls the robot for a long time, there is a need for an artificial intelligence technology that automatically controls the moving speed of the robot or the rotation speed of the cleaning brush. In this case, the artificial intelligence technology may be used alone independently of or in conjunction with the technology that makes it easy to identify even the dark part of the camera image and/or the foregoing technology of merging the images into the single image.

Thus, the robot control method according to the disclosure may include the steps of establishing a control model for adjusting the moving speed of the robot and the rotation speed of the cleaning brush by learning any single image obtained or generated by the image processing method; and adjusting the moving speed of the robot and the rotation speed of the cleaning brush based on the final wide image generated by processing the images obtained from the plurality of cameras provided in the robot according to the image processing method through the established control method.

Further, the step of adjusting the moving speed of the robot and the rotation speed of the cleaning brush includes a step of informing a robot operator that the moving speed of the robot and the rotation speed of the cleaning brush are being adjusted, and such informing may include using at least one of a text, a picture, vibration, sound, and lighting.

Meanwhile, the image processing method according to embodiments of the disclosure may have aspects that are entirely hardware, entirely software, or partially hardware and partially software. In the disclosure, the terms "unit," "module," "device," "system", or etc. are intended to refer to a combination of hardware and software run by the hardware. For example, the hardware may refer to a computing device capable of processing data, including a central processing unit (CPU), a graphic processing unit (GPU), or other processors. Further, the software may refer to a running process, an object, an executable file, a thread of execution, a program, etc.

Meanwhile, the methods according to embodiments of the disclosure may be at least partially implanted in the form of program instructions, and recorded in a computer readable recording medium. For example, the methods may be embodied with a program product having a computer readable medium including a program code, and may be implemented by a processor for carrying out any or all described steps, operations or processes.

The computer readable medium may include a program instruction, a data file, a data structure, etc. independently or combination thereof. The program instruction recorded in the medium may be specially designed or configured for embodiments, or publicly known and usable to a person having an ordinary kill in the computer software art. The computer readable recording medium may for example include magnetic media such as a hard disk, a floppy disk, and a magnetic tape; optical media such a CD-ROM, and a DVD; magneto-optical media such a floptical disk; and a ROM, RAM, a flash memory or the like hardware device specially configured to store and implement a program instruction. The program instruction may for example include not only a machine language code made by a compiler but also a high-level language code executable by a computer through an interpreter or the like. The hardware device may be configured to operate as one or more software module to perform an operation according to an embodiment, and vice versa.

In brief, an image processing method of processing a plurality of images into a single image according to the disclosure reduces fatigue of a robot operator by merging images from a plurality of cameras into one image. Further, a robot control method based on the image processing method according to the disclosure cleans a ship more cleanly while reducing the fatigue of the robot operator.

The terms used in this disclosure are generally intended as "open" terms in particular in claims (e.g., the bodies of the claims) (for example, "including" needs to be construed as meaning "including without limitations," "having" needs to be construed as meaning "at least having", and "comprising" needs to be construed as meaning "comprising without limitations." When a specific number is intentionally given in claims, the intention is explicitly described in the claims. On the other hand, no explicit description is construed as absence of the intention.

Although only certain features of the disclosure are illustrated and described above, various modifications and changes can be made by those skilled in the art. Therefore, it will be appreciated that claims are intended to include the changes and modifications within the scope of the disclosure.

The invention claimed is:

1. An image processing method of processing a plurality of images into a single image, comprising following steps of:
   obtaining a left image, a center image, and a right image respectively from a plurality of cameras in a ship cleaning robot, the plurality of cameras being arranged in a row and facing a same direction;
   generating a left top-view image, a center top-view image, and a right top-view image based on the left image, the center image, and the right image, respectively, using perspective matrix;
   generating one wide top-view image by merging the left top-view image, the center top-view image, and the right top-view image; and
   generating and outputting a final wide image based on the wide top-view image using an inverse matrix of the perspective matrix,
   wherein each of the left image, the center image, and the right image is taken underwater, and
   wherein the step of generating one wide top-view image by merging the left top-view image, the center top-view image, and the right top-view image comprises a step of making a boundary area semi-transparent in an area where at least two images among the left top-view image, the center top-view image and the right top-view image are overlapped, and removing the area where at least two images among the left top-view image, the center top-view image and the right top-view image are overlapped.

2. The image processing method of claim 1, wherein the left image, the center image, the right image, and the final wide image are perspective-view images each having one vanishing point, and the left top-view image, the center top-view image, the right top-view image, and the wide top-view image are top-view images having no vanishing points and showing bottoms as if viewed from above.

3. The image processing method of claim 1, wherein the step of obtaining at least the left image, the center image, and the right image from the plurality of cameras arranged in a row comprises the steps of:
   with regard to each of the left image, the center image, and the right image:
      obtaining brightness information, saturation information, and hue information based on a certain single image obtained or generated in the previous steps;
      obtaining inverted brightness information by inverting the obtained brightness information;
      obtaining first correction information for correcting the brightness information based on the inverted brightness information;
      generating transformed brightness information by applying the first correction information to the brightness information; and
      generating an image corrected with the transformed brightness information, the saturation information, and the hue information.

4. The image processing method of claim 3, further comprising the steps of:
   obtaining second correction information for correcting the saturation information based on the inverted brightness information; and
   generating transformed saturation information by applying the second correction information to the saturation information,
   wherein the saturation information used in the step of generating the image corrected with the transformed brightness information, the saturation information, and the hue information is replaced with the transformed saturation information.

5. The image processing method of claim 4, wherein the step of obtaining the first correction information for correcting the brightness information based on the inverted brightness information or the step of obtaining the second correction information for correcting the saturation information comprises,
   with respect to each pixel of the final wide image,
      obtaining the first correction information for the brightness information, which is not zero, or the second correction information for the saturation information, which is not zero, when the inverted brightness information is greater than or equal to a threshold value.

6. The image processing method of claim 5, wherein the first correction information and the second correction information are different.

7. A computer readable recording medium recorded with a program for performing the method according to claim 1.

8. A robot control method, comprising the image processing method according to claim 1, the method comprising the steps of:
   establishing a control model for adjusting a moving speed of a robot and a rotation speed of a cleaning brush by learning any single image obtained or generated based on the image processing method; and
   adjusting the moving speed of the robot and the rotation speed of the cleaning brush based on the final wide image generated by processing the images obtained from the plurality of cameras provided in the robot by the image processing method, through the established control method.

9. The robot control method of claim 8, wherein the step of adjusting the moving speed of the robot and the rotation speed of the cleaning brush comprises a step of informing an operator of the robot that the moving speed of the robot and the rotation speed of the cleaning brush are being adjusted,
   wherein such informing comprises using at least one of a text, a picture, vibration, sound, and lighting.

* * * * *